(12) United States Patent
Hong et al.

(10) Patent No.: US 7,768,495 B2
(45) Date of Patent: Aug. 3, 2010

(54) APPARATUS AND METHOD FOR LUMINANCE CONTROL OF LIQUID CRYSTAL DISPLAY DEVICE

(75) Inventors: Hee Jung Hong, Seoul (KR); Kyung Joon Kwon, Seoul (KR)

(73) Assignee: LG Display Co., Ltd., Seoul (KR)

( * ) Notice: Subject to any disclaimer, the term of this patent is extended or adjusted under 35 U.S.C. 154(b) by 702 days.

(21) Appl. No.: 11/136,666

(22) Filed: May 25, 2005

(65) Prior Publication Data
US 2006/0007100 A1    Jan. 12, 2006

(30) Foreign Application Priority Data
May 27, 2004    (KR)    ....................... 10-2004-0037769

(51) Int. Cl.
*G09G 3/36*    (2006.01)
(52) U.S. Cl. ..................................... 345/102
(58) Field of Classification Search ................. 345/102, 345/87, 204
See application file for complete search history.

(56) References Cited

U.S. PATENT DOCUMENTS

| | | | |
|---|---|---|---|
| 6,636,190 B2 * | 10/2003 | Hirakata et al. | 345/74.1 |
| 6,795,053 B1 * | 9/2004 | Funamoto et al. | 345/102 |
| 2002/0003522 A1 | 1/2002 | Baba et al. | |
| 2002/0057238 A1 | 5/2002 | Nitta et al. | |
| 2002/0093479 A1 | 7/2002 | Lim et al. | |
| 2004/0017348 A1 | 1/2004 | Numao | |
| 2004/0125062 A1 | 7/2004 | Yamamoto et al. | |
| 2006/0109234 A1 * | 5/2006 | Hong et al. | 345/102 |

FOREIGN PATENT DOCUMENTS

| | | |
|---|---|---|
| CN | 1304522 | 7/2001 |
| EP | 1 453 030 | 9/2004 |
| EP | 1 489 590 | 12/2004 |
| JP | 2001-125607 | 5/2001 |
| JP | 2002-100496 | 4/2002 |
| KR | 10-20020057407 | 7/2002 |
| KR | 2002-57407 | 7/2002 |
| KR | 2003-16631 | 3/2003 |

OTHER PUBLICATIONS

Translation of KR1020020057407.*

* cited by examiner

*Primary Examiner*—Amr Awad
*Assistant Examiner*—Stephen G Sherman
(74) *Attorney, Agent, or Firm*—McKenna Long & Aldridge LLP

(57) ABSTRACT

An apparatus and method for controlling luminance in an liquid crystal display device includes: a liquid crystal display panel having at least two designated areas; at least two lamp units irradiating light the designated areas of the liquid crystal display panel; an arithmetic unit configured to scan image pixels within each of the designated areas of the liquid crystal display panel, to extract a peak value of the gray level of pixels, and to calculate an average peak value for each designated area; and a lamp driver configured to control the lamp units, irradiating light to each designated area, based on the average peak value.

5 Claims, 12 Drawing Sheets

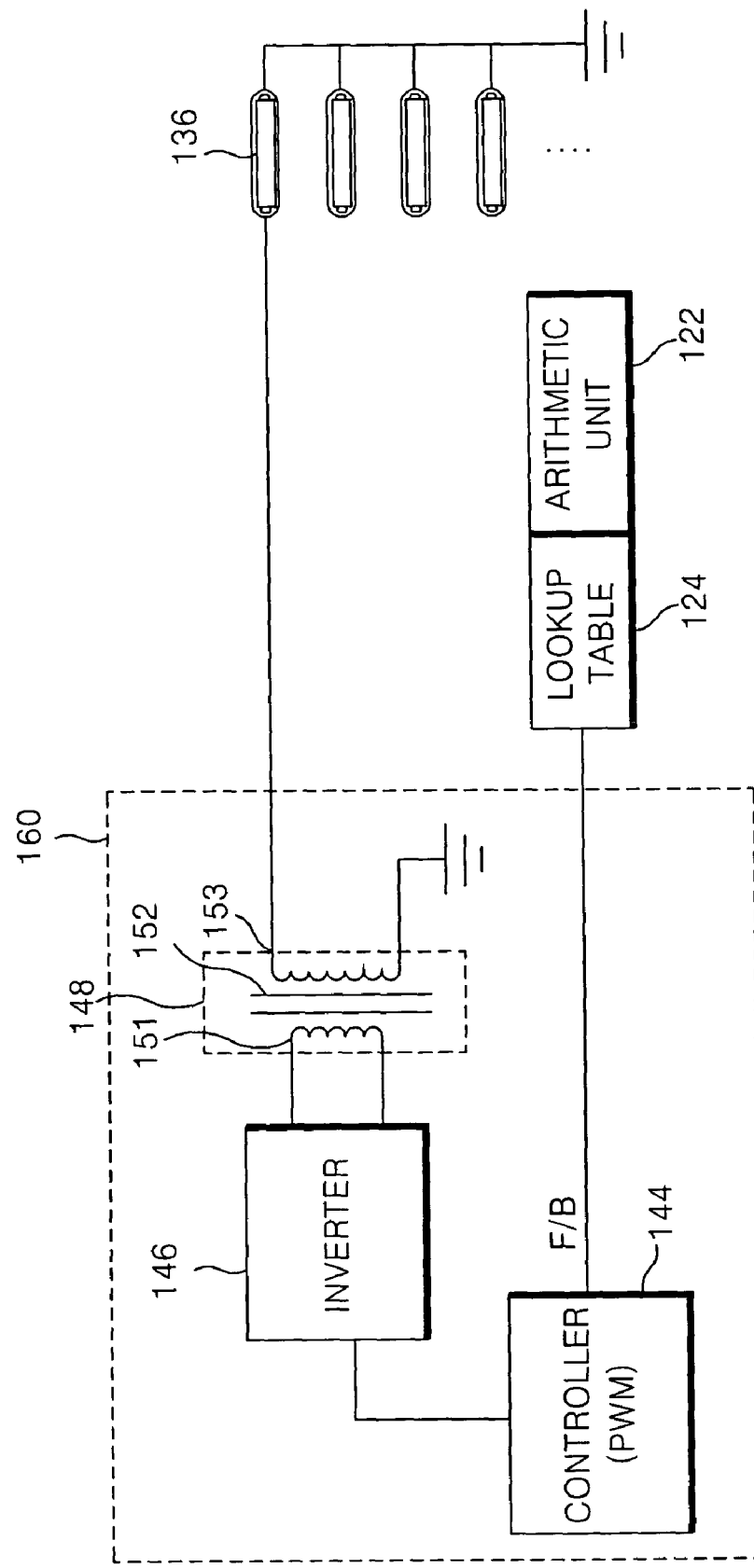

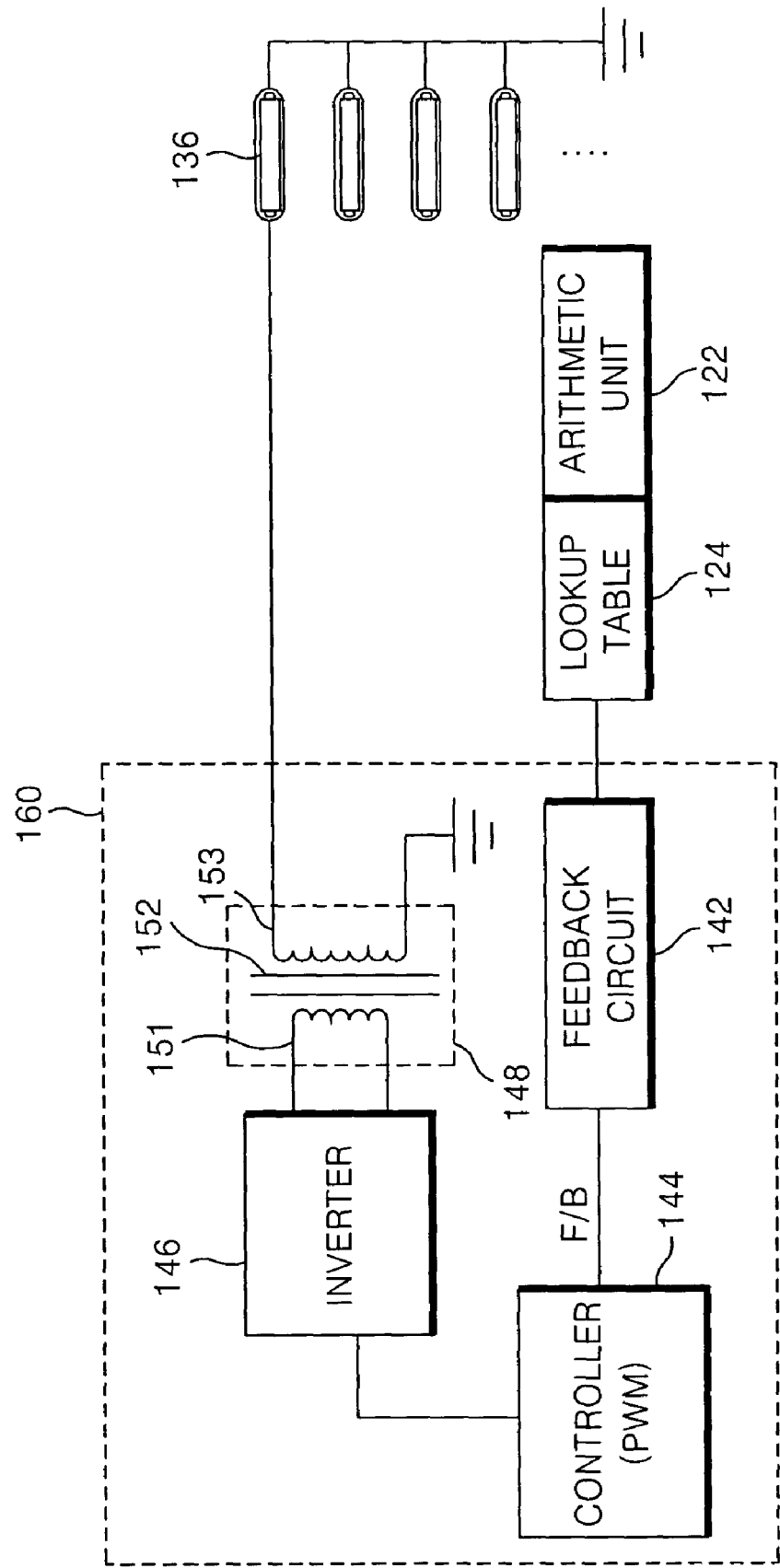

APPARATUS AND METHOD FOR LUMINANCE CONTROL OF LIQUID CRYSTAL DISPLAY DEVICE

This application claims the benefit of Korean Patent Application No. P2004-37769 filed in Korea on May 27, 2004, which is hereby incorporated by reference for all purposes as if fully set forth herein.

BACKGROUND OF THE INVENTION

1. Field of the Invention

The present invention relates to an apparatus and method for luminance control in a liquid crystal display device, and more particularly, to an apparatus and method for luminance control in a liquid crystal display device capable of reducing power consumption and improving picture quality by selectively driving a lamp.

2. Description of the Related Art

The scope of application for liquid crystal displays (LCDs) continues to increase due to the advantages of LCDs, such as lightness, thinness, and low power consumption. Generally, LCDs are used in office automation devices, audio/video devices and the like. An LCD adjusts the transmittance of light beams in accordance with an image signal to display desired pictures on a screen.

Since the LCD is not a spontaneous light-emitting display device, the LCD device uses a back light unit as a light source. There are two types of back light units utilized in LCDs, a direct-below-type, and a light guide plate-type. In the direct-below-type, several lamps are arranged in the plane, and, a diffusion panel is installed between the lamp and the liquid crystal display panel to fix the distance between the liquid crystal display panel and the lamps. In the light guide plate-type, a lamp is installed in an outer part of the LCD device, and a transparent light guide plate provides/guides light such that it is incident to the whole surface of the liquid crystal display panel.

FIGS. 1 and 2 illustrate a LCD with a direct-below-type backlight according to the related art. Referring to FIG. 2, the device includes a liquid crystal display panel 2 to display a picture, and a direct-below-type backlight unit to irradiate uniform light onto the liquid crystal display panel 2.

In the liquid crystal display panel 2, liquid crystal cells (not shown) are arranged between an upper substrate and a lower substrate. In an active matrix type display panel, a common electrode and pixel electrodes are provided. Generally, the pixel electrodes (not shown) are formed on the lower substrate, also referred to as a thin film transistor substrate, for each liquid crystal cell, and the common electrode (not shown) is integrated with the front surface of the upper substrate. Each of the pixel electrodes are connected to a thin film transistor that is used as a switching device. The pixel electrodes along with the common electrode drive the liquid crystal panel in accordance with a data signal supplied through the thin film transistor, thereby displaying pictures corresponding to a video signal.

The direct-below-type backlight unit includes a plurality of lamps 36 arranged parallel to each other; a lamp housing 34 located at the lower part of the lamps 36, a diffusion plate 12 covering the lamp housing 34, and optical sheets 10 located on the diffusion plate 12.

Each of the lamps 36 includes a glass tube filled with an inert gas, and a cathode and an anode installed at opposite ends of the glass tube. The inside of the glass tube is charged with the inert gas, and the phosphorus is spread over the inner wall of the glass tube.

In each of the lamps 36, if an alternating current AC waveform of high voltage is applied to a high voltage electrode and a low voltage electrode from an inverter (not shown), electrons are emitted from the low voltage electrode L to collide with the inert gas inside the glass tube, thus the amount of electrons are increased in geometrical progression. The increased electrons cause electric current to flow in the inside of the glass tube, so that the inert gas is excited by the electron to emit ultraviolet ray. The ultraviolet rays collide with luminous phosphorus spread over the inner wall of the glass tube emitting visible light rays. The high voltage AC waveform is continuously supplied to the lamps 36, therefore the lamps are always turned-on.

The lamp housing 34 prevents leakage of the visible light rays emitted from each of the lamps 36 and reflects light rays, progressing to the side and the rear surfaces of the lamps 36, to the front surface, i.e., toward the diffusion plate 12, thereby improving the efficiency of the light generated at the lamps 36.

The diffusion plate 12 directs the light emitted from the lamps 36 towards the liquid crystal display panel 2 and to be incident in an angle of a wide range. This is achieved, for example, by coating the diffusion plate 12 on both sides with a transparent resin.

The optical sheets 10 narrow the viewing angle of the light emitted from the diffusion plate 12, to improve the front brightness and reduce power consumption in the liquid crystal display device.

A reflection sheet 14 is arranged between the lamps 36 and the lamp housing 34 to reflect the light generated from the lamps 36 so as to direct it towards the liquid crystal display panel 2, thereby improving the efficiency of light.

The related art LCD generates a uniform light by use of the lamps 36 arranged in the lamp housing 34 to irradiate it to the liquid crystal display panel 2, thereby displaying the desired picture. However, the lamps of the related art LCD are continuously turned-on, resulting in high power consumption and the inability to realize peak brightness, wherein peak brightness is that a designated part on the liquid crystal display panel 2 is instantly brightened in order to display a picture like an explosion or a flash on the liquid crystal display panel 2.

SUMMARY OF THE INVENTION

Accordingly, the present invention is directed to an apparatus and method for luminance control in a liquid crystal display device that substantially obviates one or more of the problems due to limitations and disadvantages of the related art.

An advantage of the present invention is to provide an apparatus and method for luminance control of liquid crystal display device capable of reducing a power consumption and improving picture quality by selectively driving a lamp.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described.

In another aspect of the present invention,

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 8 is a block diagram showing a luminance control apparatus according to an embodiment of the present invention;

FIG. 10 is a block diagram illustrating a luminance control apparatus according to another embodiment of the present invention.

DETAILED DESCRIPTION OF THE ILLUSTRATED EMBODIMENTS

Reference will now be made in detail to embodiments of the present invention, examples of which are illustrated in the accompanying drawings.

Figure 1:
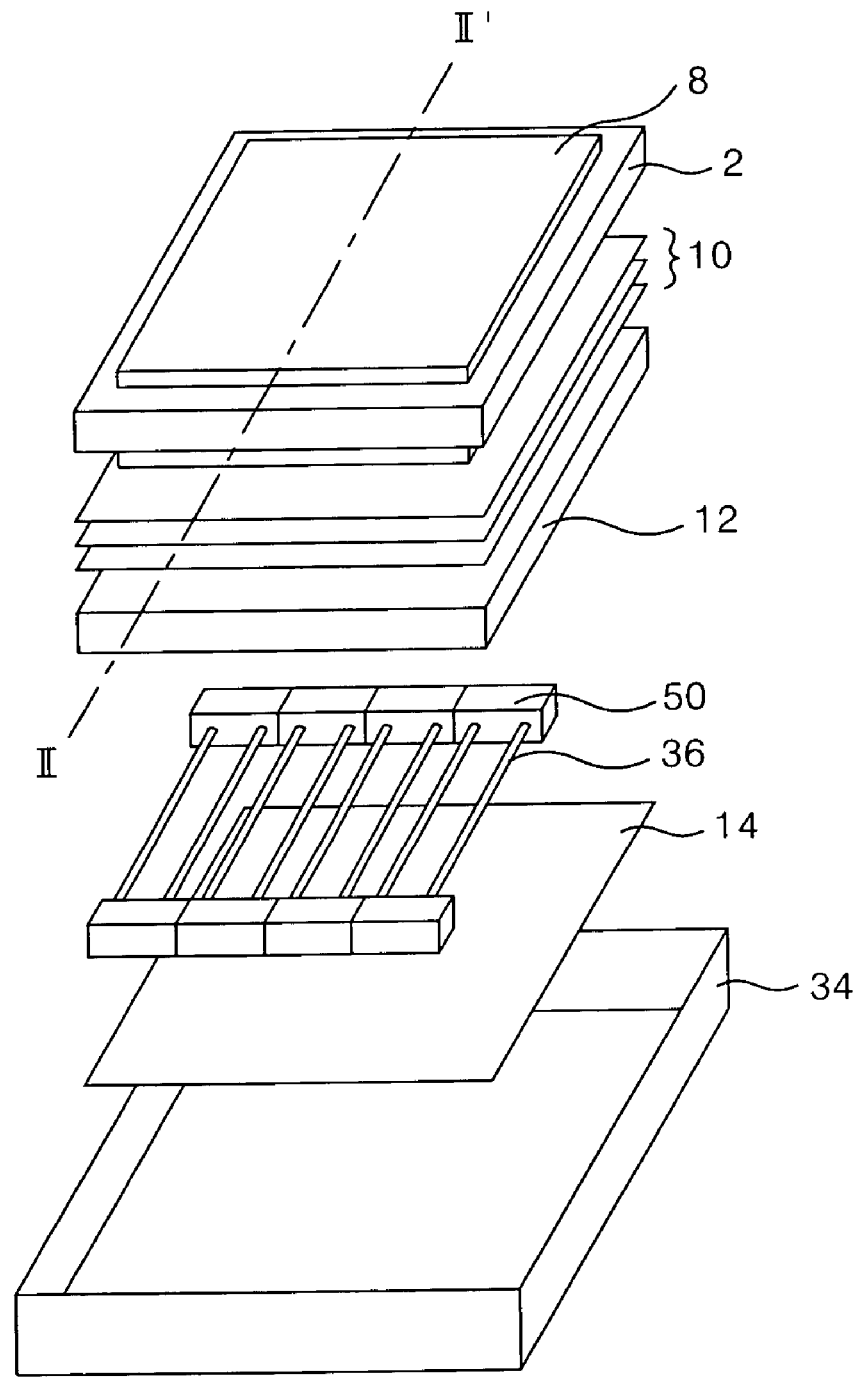
FIG. 1 is a perspective view illustrating a related art liquid crystal display device.
Figure 2:
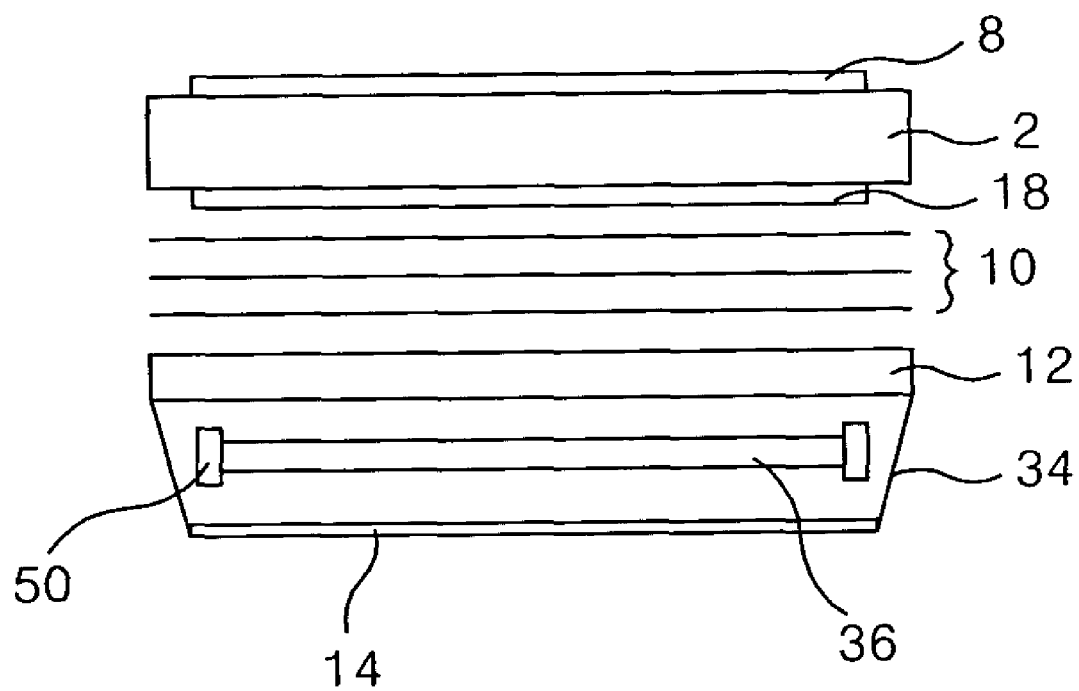
FIG. 2 is a sectional view illustrating the liquid crystal display device taken along the line II-II' in FIG. 1.
Figure 3:
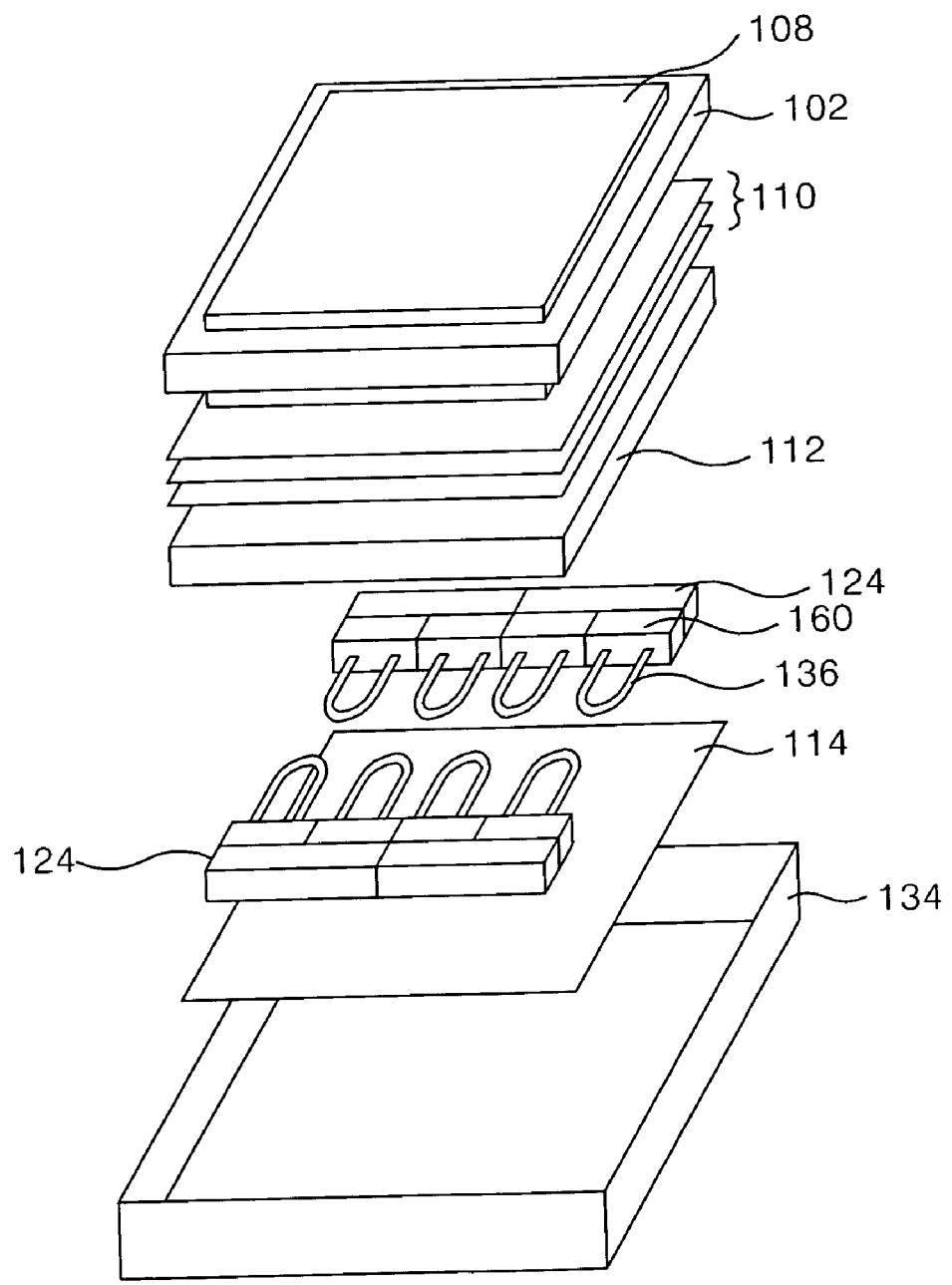
FIG. 3 is a perspective view illustrating a liquid crystal display device according to an embodiment of the present invention.

FIG. 3 is a perspective view illustrating a liquid crystal display device according to an embodiment of the present invention. Referring to FIG. 3, the liquid crystal display device according to an embodiment of the present invention includes: a liquid crystal display panel 102; and a backlight unit having a plurality of lamp units 136, each lamp unit irradiating light to a designated area of the liquid crystal display panel 102.

In the liquid crystal display panel 2, liquid crystal cells (not shown) are arranged between an upper substrate and a lower substrate. In an active matrix type display panel, a common electrode and pixel electrodes are provided. Generally, the pixel electrodes (not shown) are formed on the lower substrate, also referred to as a thin film transistor substrate, for each liquid crystal cell, and the common electrode (not shown) is integrated with the front surface of the upper substrate. Each of the pixel electrodes are connected to a thin film transistor that is used as a switching device. The pixel electrodes along with the common electrode drive the liquid crystal panel in accordance with a data signal supplied through the thin film transistor, thereby displaying pictures corresponding to a video signal.

The backlight unit includes a plurality of lamp units 136; a lamp housing 134 holding the lamp units 136; a diffusion plate 112 that diffuses light generated from the lamp housing 134; and optical sheets 110 that increase the efficiency of the light emitted from the diffusion plate 112.

Each of the lamp units 136 includes a plurality of lamps; an arithmetic unit 122 to scan a pixel value of the designated area of the liquid crystal display panel 102; a lookup table 124 that maps the resultant values calculated by the arithmetic unit 122 to a control signal; and a lamp driver 160 that drives the plurality of lamps in accordance with the control signal, as illustrated in FIG. 10.

Each lamp includes a glass tube filled with an inert gas, and a cathode and an anode installed at opposite ends of the glass tube. The inside of the glass tube is charged with the inert gas, and the phosphorus is spread over the inner wall of the glass tube. The lamps arranged parallel to each other in the lamp units 136.

The lamp housing 134 prevents leakage of the visible light rays emitted from each of the lamps and reflects light rays, progressing to the side and the rear surfaces of the lamps, to the front surface, i.e., toward the diffusion plate 112, thereby improving the efficiency of the light generated from the lamps.

The diffusion plate 112 directs the light emitted from the lamps towards the liquid crystal display panel 102 and to be incident in an angle of a wide range. This is achieved, for example, by coating the diffusion plate 112 on both sides with a transparent resin.

Figure 4:
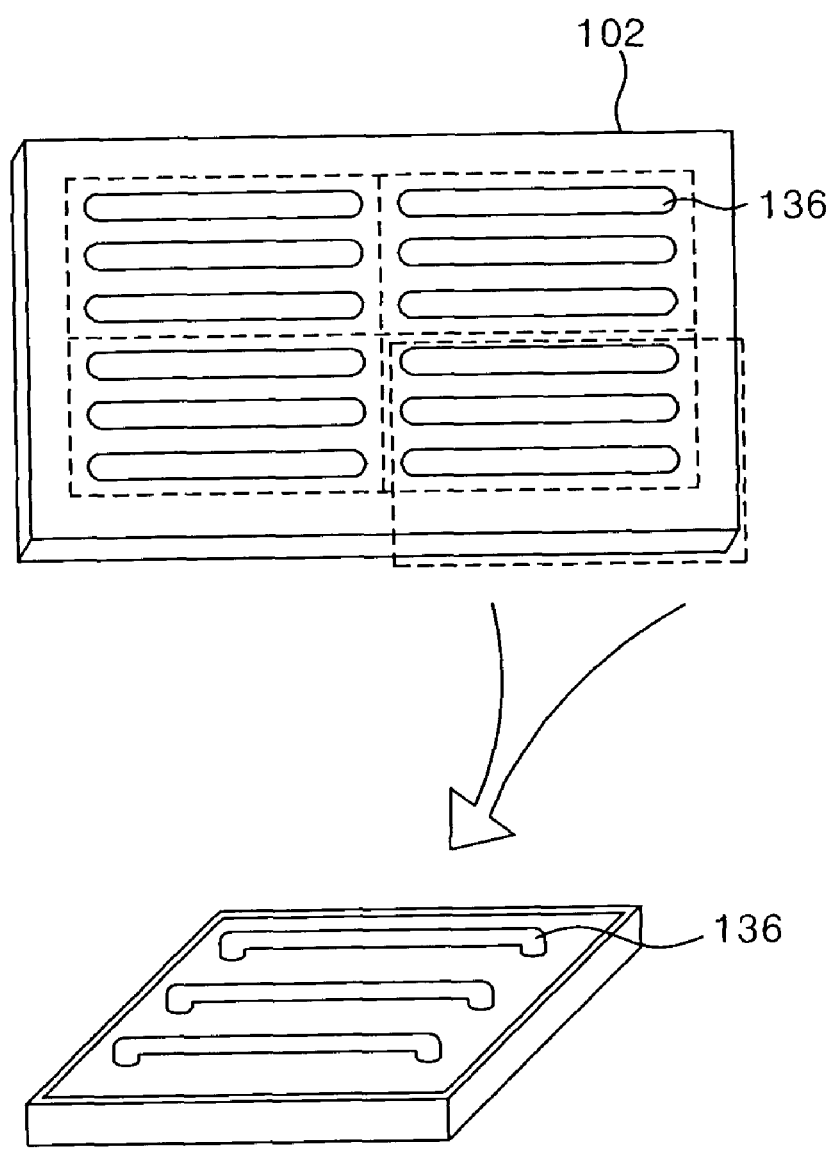
FIG. 4 illustrates an another type lamp driven according to the embodiment of the present invention.

As illustrated in FIGS. 3 and 4, each of the lamps in the plurality of lamp units 136 is formed in a "U" shape, and arranged in the housing 134 such that the middle of the lamp is directed towards the surface of the diffusion plate 112. However, the lamps may be formed in other shapes, for example, an "L" shape, a linear shape, a round shape, or the like. Accordingly, the liquid crystal display device according to the present invention is not limited by the shape of the lamps.

The optical sheets 110 narrow the viewing angle of the light emitted from the diffusion plate 112 to improve front brightness and reduce power consumption in the liquid crystal display device.

A reflection sheet 114 is arranged between the lamp units 136 and the lamp housing 134 to reflect the light generated from the lamps and direct it in the direction of the liquid crystal display panel 102, thereby improving the light efficiency.

Figure 5:
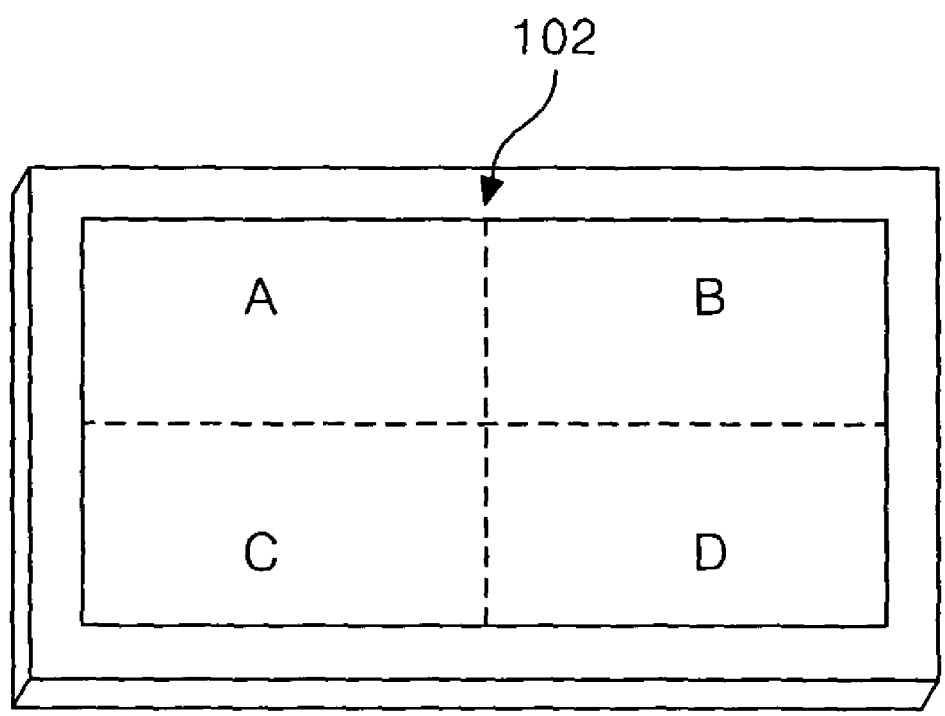
FIG. 5 illustrates the division of a liquid crystal display panel into designated areas according to an embodiment of the present invention.

The arithmetic unit 122 scans each sub-pixel or cell (for example, red, green, and blue) in the liquid crystal display panel to determine a peak value for each pixel. Then an average peak value is calculate for each designated area, for example, areas A, B, C and D as illustrated in FIG. 5, of the liquid crystal display panel. The arithmetic unit 122 includes a scan part to detect the pixel value of each divided area, and a calculating part to extract the peak value of the sub-pixels among the pixels detected from the scan part and to calculate the average value of the extracted peak values.

Assuming the liquid crystal display panel is divided into four areas as illustrated in FIG. 5, and the RGB values of the pixels displayed "A" area are measured as in the following Table 1, then the average peak value for area A is calculated as discussed below.

TABLE 1

|  | Pixel 1 | Pixel 2 | Pixel 3 | Pixel 4 | ... | Pixel End |
| --- | --- | --- | --- | --- | --- | --- |
| R (red) sub-pixel | 10 | 90 | 10 | 10 | ... | 100 |
| G (green) sub-pixel | 30 | 30 | 50 | 200 | ... | 20 |
| B (blue) sub-pixel | 60 | 10 | 60 | 60 | ... | 60 |
| Peak Value | 60 | 90 | 60 | 200 | ... | 100 |

First, the peak value among the sub-pixel values, i.e., the RGB values, for each of the pixels determined. For example, as shown in Table 1, the values for the red, green and blue sub-pixels of pixel 1 are 10, 30 and 60, respectively. Accordingly, the peak value for pixel 1 is 60, which corresponds to the blue sub-pixel. The values for the red, green and blue sub-pixels of pixel 2 are 90, 30, 10, respectively. Accordingly, the peak value for pixel 2 is 90, which corresponds to the red sub-pixel. In this way, the peak value among the RGB values of each pixel within area A is selected. The selected peak values are then added and divided by the number of the whole pixels within the designated area to determine the average value of each pixel displayed in area "A". Therefore, assuming that the total number of pixels in area "A" is 10, and the sum of the peak values is 1000, then the average peak value for area "A" is 100.

The lookup table 124 maps the average peak value for an area to a control signal in order to control the lamp driver 160. The lookup table 124 may be included in the arithmetic unit 122 or be separate from the arithmetic unit. In addition, the values stored in the lookup table 124 may be changed in accordance with the requirement of a user or the needed image display.

Figure 6:
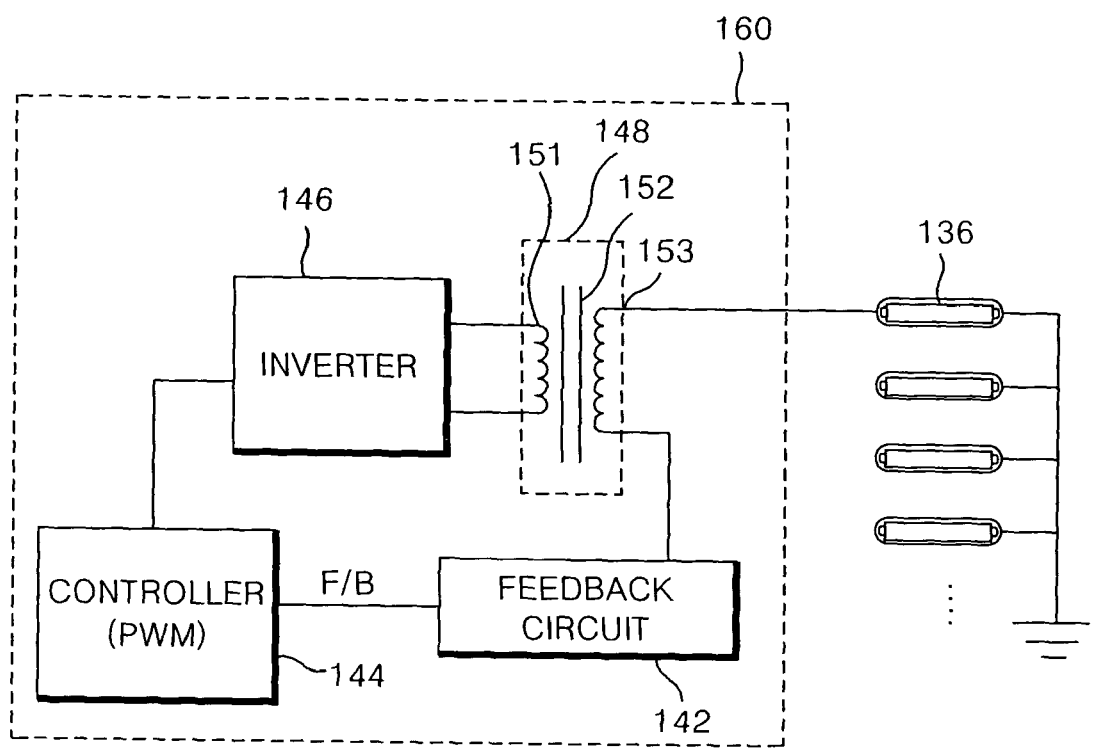
FIG. 6 is an enlarged block diagram showing the lamp driving device according to an embodiment of the present invention.

The lamp driver 160, as illustrated in FIG. 6, includes an inverter 146; a transformer 148 arranged between the inverter 146 and one end of the lamps 136; a feedback circuit 142 arranged between the transformer 148 and one end of the lamp; and a pulse width modulation ("PWM") controller 144 arranged between the inverter 146 and the feedback circuit 142.

The inverter 146 converts the voltage supplied from the voltage source into the AC waveform using a switch device that is switched by the pulse generated from the PWM controller 144. The AC voltage waveform is then transmitted to the transformer 148. The transformer 148 boosts the AC waveform supplied from the inverter 146 to a high voltage AC waveform in order to drive the lamps 136. For this, a primary winding 151 of the transformer 148 is connected to the inverter 146, a secondary winding 153 is connected to the feedback circuit 142, and an auxiliary winding 152 is arranged there between, wherein the auxiliary winding induces the voltage of the primary winding 151 to the secondary winding 153. As a result, the AC waveform supplied from the inverter 146 is boosted to the AC waveform of high voltage based on the winding ratio between the primary winding 151 and the secondary winding 153. The high voltage waveform is then supplied to the lamps.

The feedback circuit 142 detects the current transmitted to the lamps and generates a feedback voltage. The feedback circuit 142 may be located at the output terminal of the lamps to detect the output value outputted from the lamps. The PWM controller 144 controls the switching of the switch device based on the received feedback.

Figure 7:
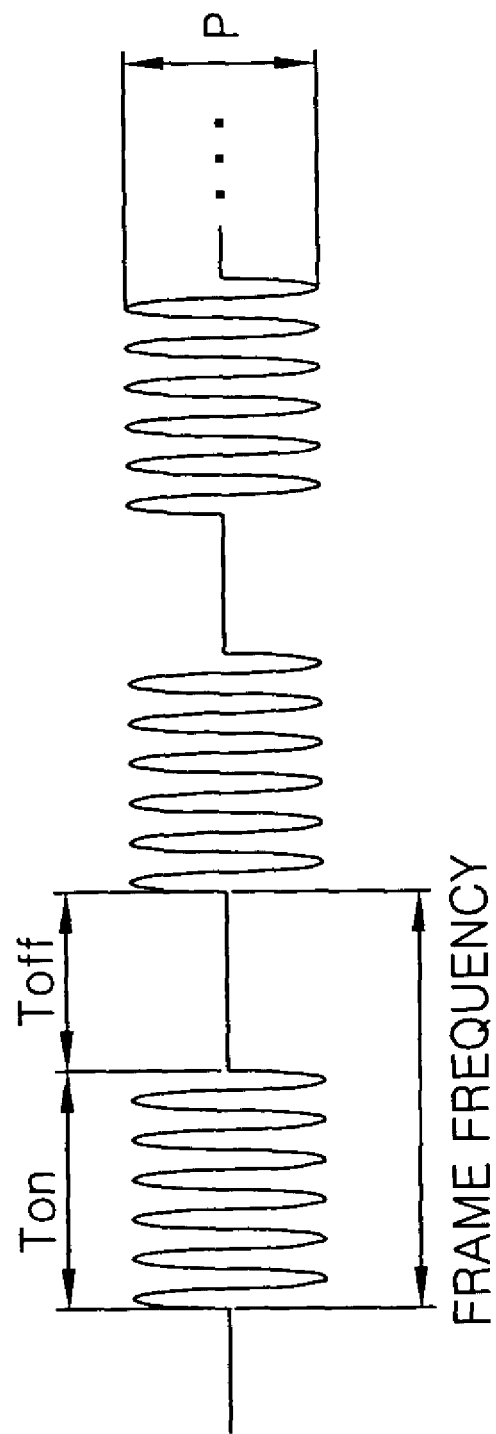
FIG. 7 illustrates a waveform generated from a pulse width modulation (PWM) controller according to an embodiment of the present invention.

Each of the PWM controllers 144 controls the switching of the switch device of the inverter 146 to change the AC waveform for each of the designated areas. The AC waveform generated from the PWM controller 144 and transmitted to the inverter 146, as shown in FIG. 7, is divided into an on-time when a pulse is formed and an off-time when the pulse is not supplied.

Figure 9A:
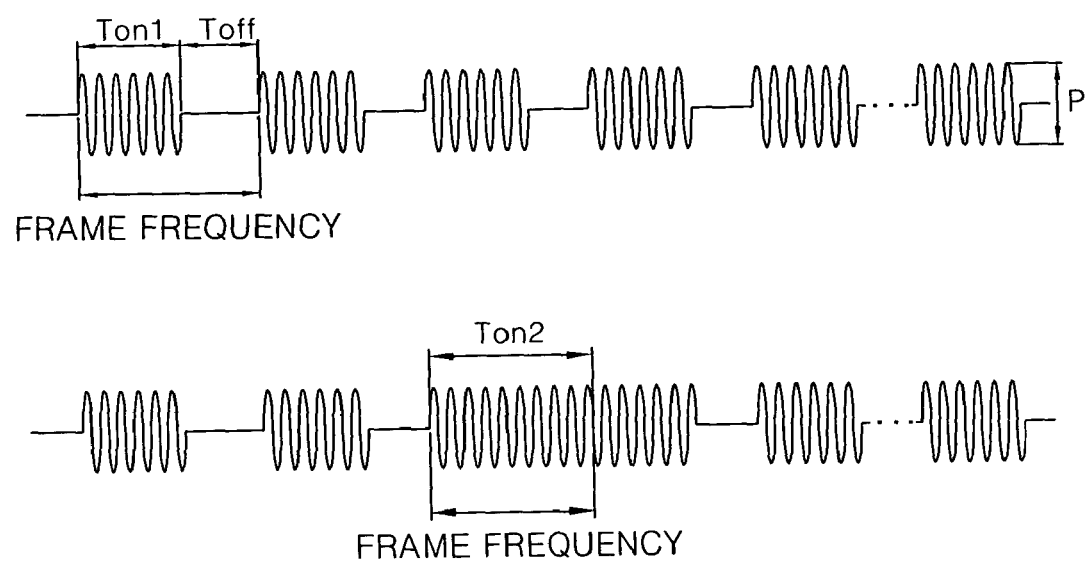
FIGS. 9A to 9C illustrate other waveforms generated from the PWM controller according to an embodiment of the present invention.
Figure 9B:
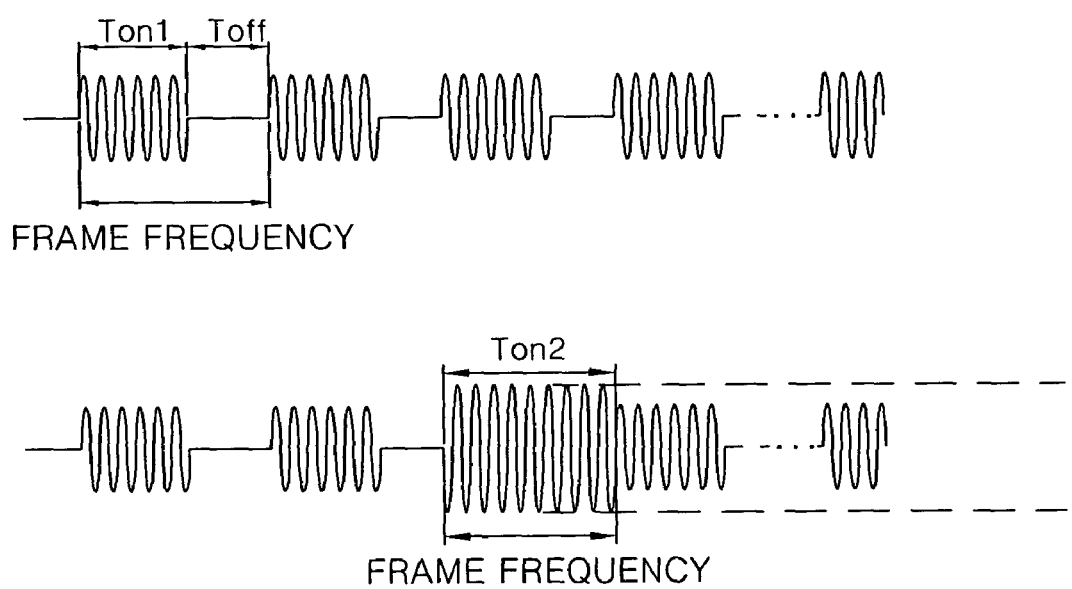
Figure 9C:
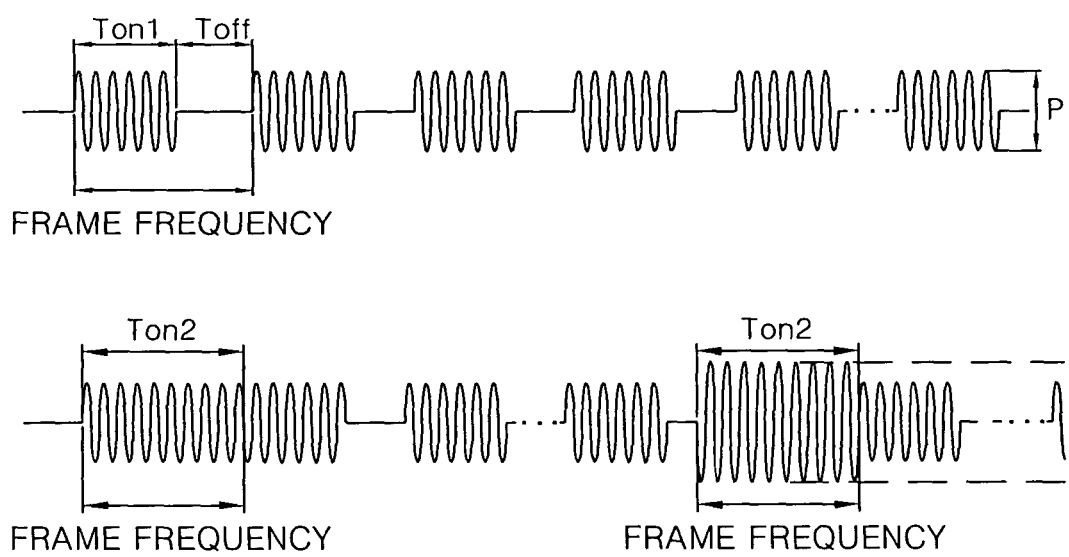

A method of controlling luminance in a liquid crystal display device according the present invention will be described with respect to FIGS. 8 to 9C. Referring to FIG. 8, first, the average peak value for the pixels in a designated area A, B, C, D of the liquid crystal display panel 102 is calculated by the arithmetic unit 122. The average peak value is then mapped using the lookup table 124 to a control signal. Then the control signal is transmitted to the PWM controller 144. The control signal may change the duty ratio of the pulse generated from the PWM controller 144, as illustrated in FIG. 9A, the amplitude of the pulse generated from the PWM controller 144, as illustrated in FIG. 9B, or both the duty ratio of the pulse and the amplitude of the pulse generated from the PWM controller 144, as illustrated in FIG. 9C.

The feedback circuit 142 may be eliminated in order to minimize the lamp driver 160. Accordingly, the pulse signal of the PWM controller 144 included in the lamp driver 160 might be change by the arithmetic unit 122 and the lookup table 124. That is, the feedback circuit 142 might be eliminated in the liquid crystal display device according to the present invention. Accordingly, in the diagram shown in FIG. 8, the feedback circuit is eliminated.

Further, as illustrated in FIG. 10, when the control signal is transmitted to the feedback circuit 142, the control signal converts the feedback voltage generated from the feedback circuit 142, thereby indirectly converting the pulse generated from the PWM controller 144. The pulse generated from the PWM controller 144 that is changed in accordance with the feedback voltage is as shown in FIGS. 9A to 9C.

Next, the pulse generated in accordance with the pulse width and/or duty ratio converted from the PWM controller 144 controls the switch device of the inverter 146 to change the tube current generated from the transformer 148 corresponding thereto and supplied to the lamps.

According to this method, assuming that in the average value of each area of FIG. 5, the peak average value of "A" area is 100, the peak average value of "B" area is 300, the peak average value of "C" area is 100, the peak average value of "D" area is 500 and the minimum and maximum range of the average value between areas is 0 to 1000, the duty ratio of the pulse generated from the PWM controller 144 has the lamp duty ratio of "A" area 10%, the lamp duty ratio of "B" area 30%, the lamp duty ratio of "C" area 10% and the lamp duty ratio of "D" area 50%. The change of the duty ratio changes the tube current flowing in each of the lamps 136, thereby controlling the brightness. Herein, the same effect might be obtained by use of the change of the amplitude of the pulse as well as the duty ratio of the pulse. Further, the arithmetic unit 122 and the lookup table 124 might be manufacture inside the lamp driver 160 as the user requires.

As described above, in the luminance control apparatus and method of the liquid crystal display device according to the embodiment of the present invention, the tube current flowing in the lamp that irradiates light to each division area of the liquid crystal display panel is changed. Accordingly, it is more suitable to express a motion picture and an image with high brightness difference than the method of driving the lamp of the whole screen of the related art. In other words, the lamp current value of the division area is determined by the average value of the peak value of the image pixels to increase the brightness of the lamp in the area where there are more bright images and to decrease the brightness in the area where there are more dark images, thereby realizing the vivid screen. Further, in the luminance control apparatus and method of the liquid crystal display device according to the embodiment of the present invention, it is possible to reduce a power consumption by dividedly driving each lamp.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A luminance control apparatus of a liquid crystal display device comprising:

a liquid crystal display panel divided into a plurality of designated areas, each designated area including a plurality of pixels, each pixel including a red sub-pixel, a green sub-pixel and a blue sub-pixel;

a plurality of lamp units, each lamp unit providing light to a designated area of the plurality of designated areas of the liquid crystal display panel;

an arithmetic unit including:
      a scan part configured to detect a gray level value of the red sub-pixel, the green sub-pixel and the blue sub-pixel for each pixel within each designated area; and
      a calculating part configured to extract a peak value of each pixel by selecting a maximum gray-level value from among the detected gray level values, and to calculate an average peak value of each designated area by averaging the extracted peak values of the pixels within the designated area;

a lamp driver for each of the plurality of lamp units, each lamp driver configured to control the corresponding lamp unit based on the calculated average peak value corresponding to the designated area of the lamp unit; and a look up table arranged between the arithmetic unit and the lamp driver, the lookup table configured to map the average peak value calculated by the arithmetic unit to a control signal, wherein each of the plurality of lamp units are divisionally driven in each designated area every image frame.

2. The luminance control apparatus according to claim 1, wherein the lamp driver includes:

an inverter circuit that boosts a voltage supplied from a power source to generate a boosted alternating current signal, and supplies the boosted alternating current signal to the lamp units; and a pulse width modulator arranged between the inverter circuit and the arithmetic unit to control the signal generated from the inverter circuit in accordance with the average peak value calculated by the arithmetic unit.

3. The luminance control apparatus according to claim 1, wherein the arithmetic unit is integrated within the lamp driver.

4. A method for controlling luminance in a liquid crystal display device divided into a plurality of designated areas each designated area including a plurality of pixels, each pixel including a red sub-pixel, a green sub-pixel and a blue sub-pixel, the liquid crystal display device comprising a plurality of lamp units, each lamp unit providing light to a designated area of the liquid crystal display panel, the method comprising:

calculating an average peak value for pixels for each designated area of the liquid crystal display panel; and
   controlling the luminance of each lamp unit based on the calculated average peak value corresponding to the designated area of the lamp unit,
   wherein the calculating the average peak value for each designated area of the liquid crystal display panel comprises:
   scanning each pixel within each designated area of the liquid crystal display panel to detect a gray level value of the red sub-pixel, the green sub-pixel and the blue sub-pixel for each pixel;
   determining a peak value for each pixel by selecting a maximum gray level value from among the detected gray level values; and
   calculating an average peak value of each designated area by averaging the determined peak values of the pixels within the designated area,
   wherein controlling the luminance of each lamp unit based on the calculated average peak value corresponding to the designated area of the lamp unit comprises:
   mapping a look up table and the average peak value; and
   divisionally driving each of the plurality of lamp units in each designated area every image frame.

5. The luminance control method according to claim 4, wherein controlling the luminance of the plurality of lamp units based on the calculated average peak value for a designated area comprises:
   converting at least one of a pulse duty ratio and a pulse amplitude of a pulse driving the lamp units based on the average peak value; and
   converting a tube current to be supplied the lamp unit in accordance with at least one of the converted pulse duty ratio and pulse amplitude.

* * * * *